United States Patent
Bae et al.

(10) Patent No.: US 9,037,899 B2
(45) Date of Patent: *May 19, 2015

(54) AUTOMATED NODE FENCING INTEGRATED WITHIN A QUORUM SERVICE OF A CLUSTER INFRASTRUCTURE

(71) Applicant: INTERNATIONAL BUSINESS MACHINES CORPORATION, Armonk, NY (US)

(72) Inventors: Myung Bae, Poughkeepsie, NY (US); Robert K. Gardner, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/085,579

(22) Filed: Nov. 20, 2013

(65) Prior Publication Data
US 2014/0082409 A1    Mar. 20, 2014

Related U.S. Application Data

(63) Continuation of application No. 13/718,197, filed on Dec. 18, 2012, now Pat. No. 8,621,263, which is a continuation of application No. 12/784,011, filed on May 20, 2010, now Pat. No. 8,381,017.

(51) Int. Cl.
*G06F 11/00* (2006.01)
*G06F 11/07* (2006.01)
(Continued)

(52) U.S. Cl.
CPC .......... *G06F 11/0709* (2013.01); *G06F 11/181* (2013.01); *G06F 11/1425* (2013.01); *G06F 11/202* (2013.01)

(58) Field of Classification Search
CPC .............. G06F 11/0709; G06F 11/142; G06F 11/1425; G06F 11/20; G06F 11/2023; G06F 11/2025; G06F 11/2043; G06F 11/3006; G06F 11/181; G06F 11/202
USPC ............... 714/4.21, 4.1, 4.2, 4.3, 42; 707/737
See application file for complete search history.

(56) References Cited

U.S. PATENT DOCUMENTS

| | | | |
|---|---|---|---|
| 6,012,150 | A | 1/2000 | Bartfai et al. |
| 6,108,699 | A | 8/2000 | Moiin et al. |

(Continued)

OTHER PUBLICATIONS

Devarakonda, M. et al, "Recovery in the Calypso File System", ACM Transactions on Computer Systems (TOCS), vol. 14, Issue 3, pp. 287-310, 24 pages, Aug. 1996.

(Continued)

*Primary Examiner* — Joseph D Manoskey
(74) *Attorney, Agent, or Firm* — Parashos T. Kalaitzis; Amy J. Pattillo

(57) ABSTRACT

A quorum service detects liveness failures of at least two failed nodes in a domain of a cluster infrastructure layer of a cluster environment within a limited time frame and adds the at least two failed nodes to a list of nodes set to pending to be fenced by a group leader node. The quorum service determines whether the at least two failed nodes include the group leader node. The quorum service, responsive to the at least two failed nodes not including the group leader node, triggers the group leader node to trigger at least one fencing operation to fence the at least two failed nodes in the list of nodes. The quorum service, responsive to the at least two failed nodes including the group leader node, sets a new node as the group leader node and triggers the new node set as the group leader node to trigger the at least one fencing operation to fence the at least two failed nodes in the list of nodes.

12 Claims, 7 Drawing Sheets

(51) Int. Cl.
*G06F 11/18* (2006.01)
*G06F 11/14* (2006.01)
*G06F 11/20* (2006.01)

(56) References Cited

U.S. PATENT DOCUMENTS

| | | |
|---|---|---|
| 6,338,092 B1 | 1/2002 | Chao et al. |
| 6,915,391 B2 | 7/2005 | Wang-Knop |
| 6,965,936 B1 | 11/2005 | Wipfel et al. |
| 7,516,285 B1 | 4/2009 | Haynes et al. |
| 7,543,046 B1 | 6/2009 | Bae et al. |
| 7,685,358 B1 | 3/2010 | Larson et al. |
| 8,381,017 B2 | 2/2013 | Bae et al. |
| 2002/0078312 A1 | 6/2002 | Wang-Knop et al. |
| 2002/0188590 A1 | 12/2002 | Curran et al. |
| 2003/0233594 A1 | 12/2003 | Earl |
| 2005/0273645 A1 | 12/2005 | Satran et al. |
| 2005/0283641 A1 | 12/2005 | Clark et al. |
| 2006/0242453 A1 | 10/2006 | Kumar et al. |
| 2007/0022138 A1 | 1/2007 | Erasani et al. |
| 2007/0022314 A1 | 1/2007 | Erasani et al. |
| 2008/0040626 A1* | 2/2008 | Karr et al. .................... 713/500 |
| 2008/0250267 A1 | 10/2008 | Brown et al. |
| 2009/0113034 A1* | 4/2009 | Krishnappa et al. .......... 709/223 |
| 2011/0238842 A1 | 9/2011 | Massa et al. |
| 2011/0289344 A1 | 11/2011 | Bae et al. |
| 2013/0132762 A1 | 5/2013 | Bae et al. |

OTHER PUBLICATIONS

Carmona, E et al, "A Flexible High Demand Storage System for Magic-I and Magic-11 Using GFS", Proceedings of the 31st ICRC, Lodz, Jul. 2009, 4 pages.

Welch, B., "Integrated System Models for Reliable Petascale Storage Systems," Proceedings of the 2nd International Petascale Data Storage Workshop (PDSW '07), Nov. 2007, 5 pages.

Non-final Office Action, mailing date Mar. 28, 2012, U.S. Appl. No. 12/784,011, filed May 20, 2010, 21 pages.

Final Office Action, mailing date Jul. 17, 2012, U.S. Appl. No. 12/784,011, filed May 20, 2010, 15 pages.

Notice of Allowance, mailing date Dec. 19, 2012, U.S. Appl. No. 12/784,011, filed May 20, 2010, 20 pages.

Non-final Office Action, mailing date Apr. 25, 2013, U.S. Appl. No. 13/718,197, filed Dec. 18, 2012, 26 pages.

Notice of Allowance, mailing date Aug. 20, 2013, U.S. Appl. No. 13/718,197, filed Dec. 18, 2012, 25 pages.

* cited by examiner

AUTOMATED NODE FENCING INTEGRATED WITHIN A QUORUM SERVICE OF A CLUSTER INFRASTRUCTURE

CROSS-REFERENCE TO RELATED APPLICATIONS

This application is a continuation of commonly assigned U.S. patent application Ser. No. 13/718,197, filed Dec. 18, 2012, which is a continuation of U.S. patent application Ser. No. 12/784,011, filed May 20, 2010.

BACKGROUND

1. Technical Field

This invention relates in general to automated management of cluster systems, and more particularly, to integrating automated node fencing into quorum services of a cluster infrastructure for providing automated failure and recovery services at the cluster infrastructure level and for reporting a consistent, reliable view of cluster node health to distributed applications.

2. Description of the Related Art

Computer clusters or cluster environments are groups of interconnected computing elements, or nodes, associated in such a way as to facilitate interoperability and management. The nodes in a cluster may work in tandem to provide more efficient performance and availability than is typically available in a single computer. One or more nodes in a cluster may access one or more resources and one or more nodes in a cluster may share a particular resource.

A cluster infrastructure may provide for organizing nodes of a cluster into domains, where a quorum service manages the configuration or membership database indicating the role of each node in each domain as either active or in stand by. The cluster infrastructure may provide quorum services for maintaining a membership status of each node in a domain. In addition, the cluster infrastructure may provide quorum services that, upon a network failure that partitions the cluster from a group of nodes that communicate directly with one another over dedicated network connections into two sub-domains with nodes in one sub-domain that cannot communicate with nodes in the other sub-domain, control which partition retains the quorum and is allowed to continue operating an application after the failure occurs. Distributed applications running atop a cluster infrastructure may request the cluster infrastructure to provide a health status of each node for use by the distributed applications in safe control and failover of shared resources, however the cluster health status reported by quorum services alone merely indicates the membership status of a node within a quorum. Node quorum membership status alone, however, may be insufficient to guarantee safe management of shared resources when partitions occur within a cluster environment because the network failures may prevent cross node communication between the partition pieces. Because a cluster health status which indicates node quorum membership status alone may be insufficient to guarantee safe management of shared resources, a programmer may insert code into distributed applications to manage a network failure by attempting to block one or more nodes from accessing shared resources. In one example, the programmer may insert code to attempt to fence a node prior to processing a failover to prevent corrupting shared resources, where the node fencing may direct power or I/O controls to prevent one node from accessing a shared resource even when cross node communication is not available. In particular, node fencing separate nodes which may have access to a shared resource from nodes which must not have access to a shared resource.

BRIEF SUMMARY

In view of a cluster infrastructure with quorum services to provide a node health to distributed applications for managing safe control and failover of shared resources, but the quorum membership status alone being insufficient for safe control and failover of shared resources, there is a need for a method, system, and program for integrating node fencing into the quorum services of a cluster infrastructure to provide automated failover and recovery services at the cluster infrastructure level and to report a reliable, consistent cluster health status for each node that represents the health of each node in a cluster with respect to each node's ability to control and access shared resources.

In one embodiment, a method for managing quorum services in a cluster infrastructure for reliable failover of shared resources is directed to, responsive to detecting, using a processor, by a quorum service, a plurality of liveness failures of at least two failed nodes from among a plurality of nodes in a domain of a cluster infrastructure layer of a cluster environment within a limited time frame, adding the at least two failed nodes to a list of nodes set to pending to be fenced by a group leader node from among the plurality of nodes. The method is directed to determining, by the quorum service, whether the at least two failed nodes include the group leader node. The method is directed, responsive to the at least two failed nodes not including the group leader node, to triggering, by the quorum service, the group leader node to trigger at least one fencing operation to fence the at least two failed nodes in the list of nodes. The method is directed to, responsive to the at least two failed nodes including the group leader node, setting a new node as the group leader node and triggering, by the quorum service, the new node set as the group leader node to trigger the at least one fencing operation to fence the at least two failed nodes in the list of nodes.

In another embodiment, a computer system for managing quorum services in a cluster infrastructure for reliable failover of shared resources comprises a quorum service implemented in a cluster environment on at least one processor coupled to at least one memory. The computer system comprises the quorum service, responsive to detecting a plurality of liveness failures of at least two failed nodes from among a plurality of nodes in a domain of a cluster infrastructure layer of the cluster environment within a limited time frame, operative to add the at least two failed nodes to a list of nodes set to pending to be fenced by a group leader node from among the plurality of nodes. The computer system comprises the quorum service operative to determine whether the at least two failed nodes include the group leader node. The computer system comprises the quorum service, responsive to the at least two failed nodes not including the group leader node, operative to trigger the group leader node to trigger at least one fencing operation to fence the at least two failed nodes in the list of nodes. The computer system comprises the quorum service, responsive to the at least two failed nodes including the group leader node, operative to set a new node as the group leader node and operative to trigger the new node set as the group leader node to trigger the at least one fencing operation to fence the at least two failed nodes in the list of nodes.

In another embodiment, a computer program product for managing quorum services in a cluster infrastructure for reliable failover of shared resources comprises one or more computer-readable tangible storage devices. The computer program product comprises program instructions, stored on at least one of the one or more storage devices, responsive to detecting a plurality of liveness failures of at least two failed nodes from among a plurality of nodes in a domain of a cluster infrastructure layer of a cluster environment within a limited time frame, to add the at least two failed nodes to a list of nodes set to pending to be fenced by a group leader node from among the plurality of nodes. The computer program product comprises program instructions, stored on at least one of the one or more storage devices, to determine whether the at least two failed nodes include the group leader node. The computer program product comprises program instructions, stored on at least one of the one or more storage devices, responsive to the at least two failed nodes not including the group leader node, to trigger the group leader node to trigger at least one fencing operation to fence the at least two failed nodes in the list of nodes. The computer program product comprises program instructions, stored on at least one of the one or more storage devices, responsive to the at least two failed nodes including the group leader node, to set a new node as the group leader node and to trigger the new node set as the group leader node to trigger the at least one fencing operation to fence the at least two failed nodes in the list of nodes.

BRIEF DESCRIPTION OF THE SEVERAL VIEWS OF THE DRAWINGS

The novel features believed characteristic of one or more embodiments of the invention are set forth in the appended claims. The one or more embodiments of the invention itself however, will best be understood by reference to the following detailed description of an illustrative embodiment when read in conjunction with the accompanying drawings, wherein:

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In addition, in the following description, for purposes of explanation, numerous systems are described. It is important to note, and it will be apparent to one skilled in the art that the present invention may execute in a variety of systems, including a variety of computer systems and electronic devices operating any number of different types of operating systems.

Figure 1:
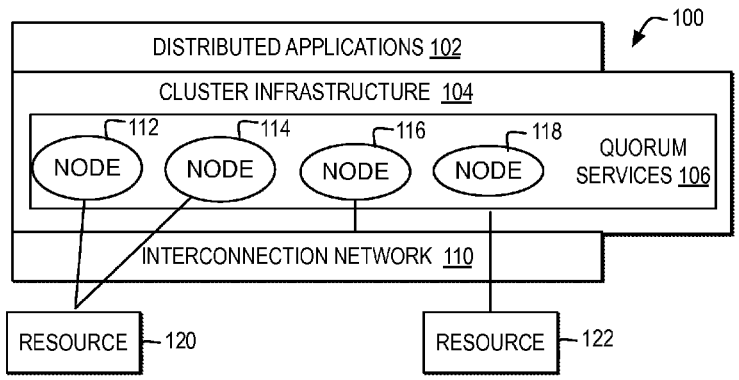
FIG. 1 is a block diagram depicting one example of a cluster environment implementing a cluster infrastructure with quorum services integrated with at least one automated fencing operation.

With reference now to the Figures, and in particular with reference to FIG. 1, a block diagram illustrates one example of a cluster environment implementing a cluster infrastructure with quorum services integrated with at least one automated fencing operation. In the example, a cluster environment 100 includes an interconnection network 110 for connecting multiple nodes, illustrated as nodes 112, 114, 116, and 118.

Each of nodes 112, 114, 116, and 118 may include multiple types of computing nodes including, but not limited to, one or more of a processing node, an input/output (I/O) node, a singe processor system, a multiple processor system, a cluster system of multiple computing nodes, a grid environment, and other systems including a network interface for connecting to interconnection network 110. Those of ordinary skill in the art will appreciate that while FIG. 1 illustrates nodes 112, 114, 116, and 118, cluster environment 100 may include any number of nodes implemented in one or more network protocol architectures.

In the example depicted, each of nodes 112, 114, 116, and 118 may include one or more adapters as part of the network interface for connecting to interconnection network 110 and for interfacing with one or more resources, such as resources 120 and 122. It will be understood that multiple types of adapters may be implemented by each of nodes 112, 114, 116, and 118, where each adapter may communicate with another adapter, a switch, or other component within interconnection network 110.

Interconnection network 110 may include one or more types of network elements, switching elements, nodes, clusters, adapters, and other elements for communicatively connecting with nodes 112, 114, 116, and 118. In addition, interconnection network 110 may implement one or more types of underlying network architectures and services. For example, interconnection network 110 may include, but is not limited to, the Internet, a wide area networks (WANs), a local area networks (LANs), an Ethernet, a token ring, and a network service providers. Further, interconnection network 110 may transport data between nodes using one or more types of communication protocols. In one example, interconnection network 110 implements protocols for transferring data within a packet-switching network, such as using the transmission control protocol/internet protocol (TCP/IP), however, interconnection network 110 may include multiple gateways, routers, and other hardware, software and other elements to enable integration of networks using additional or alternate protocols and additional or alternate layers of protocols. The hardware and software implemented by interconnection network 110 may provide one or more of reliable and unreliable passing of messages.

A cluster infrastructure 104 includes one or more software components implemented locally and globally across nodes 112, 114, 116, and 118 for managing one or more clusters of nodes from among nodes 112, 114, 116, and 118 within cluster environment 100. Distributed applications 102 may call one or more functions, application programming interfaces, processes, commands, and other elements of cluster infrastructure 104 for running distributed applications 102 across one or more of nodes 112, 114, 116, and 118.

In one example, cluster infrastructure 104 may implement Reliable Scalable Cluster Technology (RSCT) including multiple software components that hold together nodes 112, 114, 116, and 118 within cluster environment 100, manage system availability, scalability, and other services for cluster environment 100, and provide components for implementing quorum services 106. One of ordinary skill in the art will appreciate that cluster infrastructure 104 may implement additional or alternate types of cluster software infrastructure.

As illustrated, cluster infrastructure 104 includes quorum services 106. Quorum services 106 may organize one or more of nodes 112, 114, 116, and 118 into a peer domain that provides a cluster of nodes configured for high availability. In one example, quorum services 106 may manage a quorum membership database with a quorum membership configuration and status of each node within a peer domain and may implement membership services for monitoring for node and network failures within a peer domain and for cross node and process coordination.

Quorum services 106 include checking for the liveness of nodes interconnected in a peer domain. In one example, quorum services 106 may use heartbeats to check the liveness of nodes within a peer domain. One or more types of events may occur within a peer domain which result in one or more of the nodes failing a liveness check and the peer domain being partitioned, or divided, into two or more sub-domains, where nodes in one sub-domain are no longer aware of the nodes in any other sub-domain. Upon detection of a failure within a peer domain, quorum services 106 may select which sub-domain has operational quorum and may continuing operating. In particular, selection of which sub-domain has operational quorum is critical when there is a shared resource, such as resource 120, because data corruption can occur if nodes in different sub-domains attempt to access the same shared resource.

In the present invention, quorum services 106 detect shared resources, such as resource 120 that is shared between nodes 112 and 114, and provide automated failure and recovery support services at the level of cluster infrastructure 104. First, quorum services 106 provide automated failure and recovery support services at the cluster infrastructure level by automatically implementing node fencing integrated into membership and quorum management. Second, quorum services 106 provide automated failure and recovery support services at the cluster infrastructure level by managing a reliable, consistent cluster health status guaranteeing the reported status represents the ability of each node to provide service and access shared resources and persistently reporting the cluster health status to distributed applications 102. To integrate automated node fencing into quorum services 106, the cluster health status is updated with a usability state of each node, where the usability state refers to each node's ability to provide service and access shared resources.

By incorporating automated node fencing into quorum services 106, node fencing is driven by cluster infrastructure 104 level quorum management, rather than by distributed applications 102, allowing the node fencing to be performed asynchronously from node failures to better support continued automated operations by cluster infrastructure 104 and maintenance of a consistent view of cluster node health. Node fencing integrated within quorum management guarantees the current usability state of each node following failures, allowing distributed applications 102 to trust that the cluster health status reported by cluster infrastructure 104 with current usability states reflects the actual status of the node, removing the need for programmers to insert code for node fencing code into distributed applications 102 to control cluster infrastructure 104 for failure and recovery from the application level. In particular, while cluster infrastructure 104 may still provide a separate node fencing command that a programmer may call from distributed applications 102, such as a STONITH command callable by distributed applications 102, by incorporating automated node fencing into quorum services 106, a programmer may rely on cluster infrastructure 104 failure and recovery services to report a reliable cluster health status and forego inserting additional code to call node fencing mechanisms.

One skilled in the art will appreciate that the number and configuration of nodes, switches and links shown in FIG. 1 is provided as an example cluster environment. Numerous implementations and arrangements of a number of nodes, switches, and links in all types of data and computing networks may be implemented.

Figure 2:
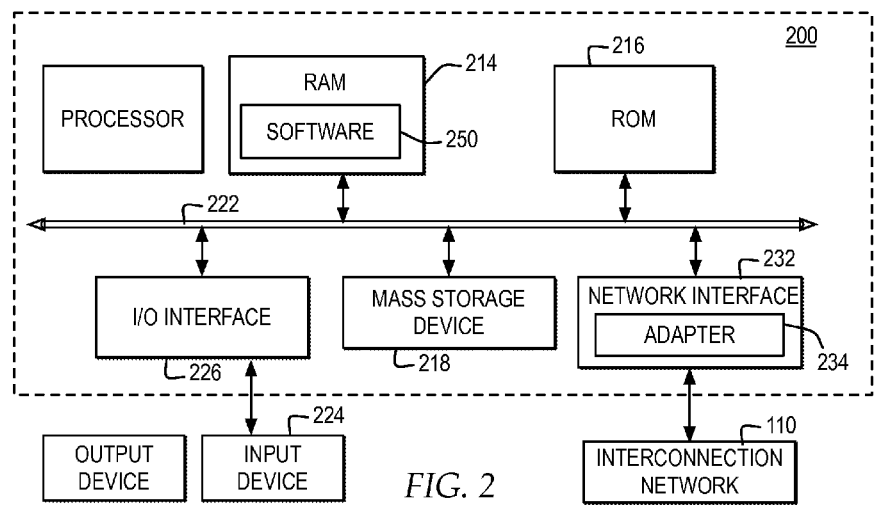
FIG. 2 is a block diagram illustrating one example of a computer system in which the present invention may be implemented.

Referring now to FIG. 2, a block diagram illustrates one example of a computer system in which the present invention may be implemented. The present invention may be performed in a variety of systems and combinations of systems, made up of functional components, such as the functional components described with reference to computer system 200 and may be communicatively connected to a network, such interconnection network 110. As described herein, one or more functional components of computer system 200 may represent a node, such as one of nodes 112, 114, 116, and 118, or a grouping of multiple instances of one or more functional components of computer system 200 may represent a node, such as one of nodes 112, 114, 116, and 118.

Computer system 200 includes a bus 222 or other communication device for communicating information within computer system 200, and at least one hardware processing device, such as processor 212, coupled to bus 222 for processing information. Bus 222 preferably includes low-latency and higher latency paths that are connected by bridges and adapters and controlled within computer system 200 by multiple bus controllers. When implemented as a server or node, computer system 200 may include multiple processors designed to improve network servicing power. Where multiple processors share bus 222, additional controllers (not depicted) for managing bus access and locks may be implemented.

Processor 212 may be at least one general-purpose processor such as IBM's PowerPC (PowerPC is a registered trademark of International Business Machines Corporation) processor that, during normal operation, processes data under the control of software 250, which may include at least one of application software, an operating system, middleware, and other code and computer executable programs accessible from a dynamic storage device such as random access memory (RAM) 214, a static storage device such as Read Only Memory (ROM) 216, a data storage device, such as mass storage device 218, or other data storage medium. Software 250 may include, but is not limited to, applications, protocols, interfaces, and processes for controlling one or more systems within a network including, but not limited to, an adapter, a switch, a cluster system, and a grid environment.

Figure 11:
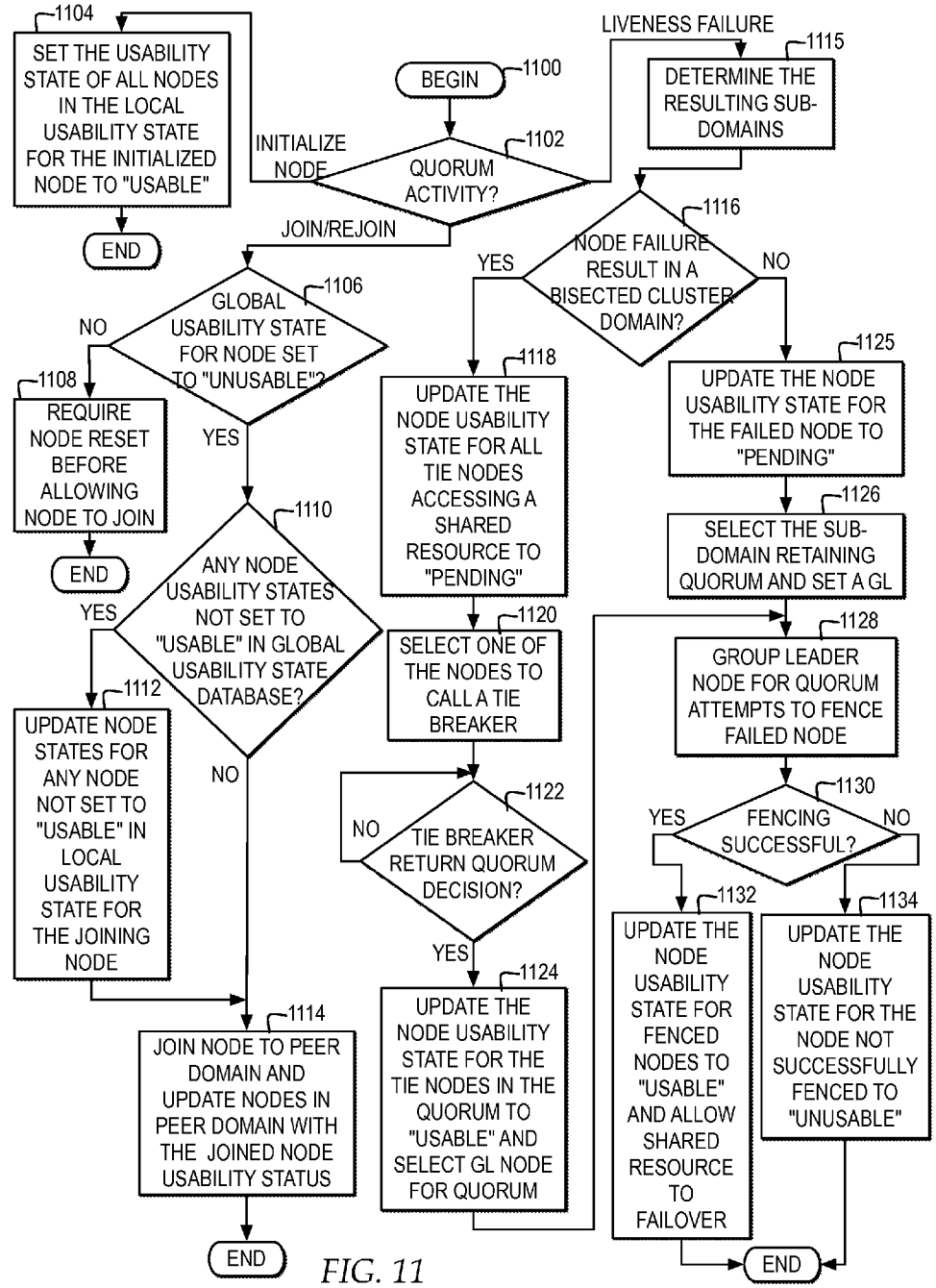
FIG. 11 is a high level logic flowchart depicting a process and program for controlling quorum service events where the quorum services integrate node fencing.
Figure 12:
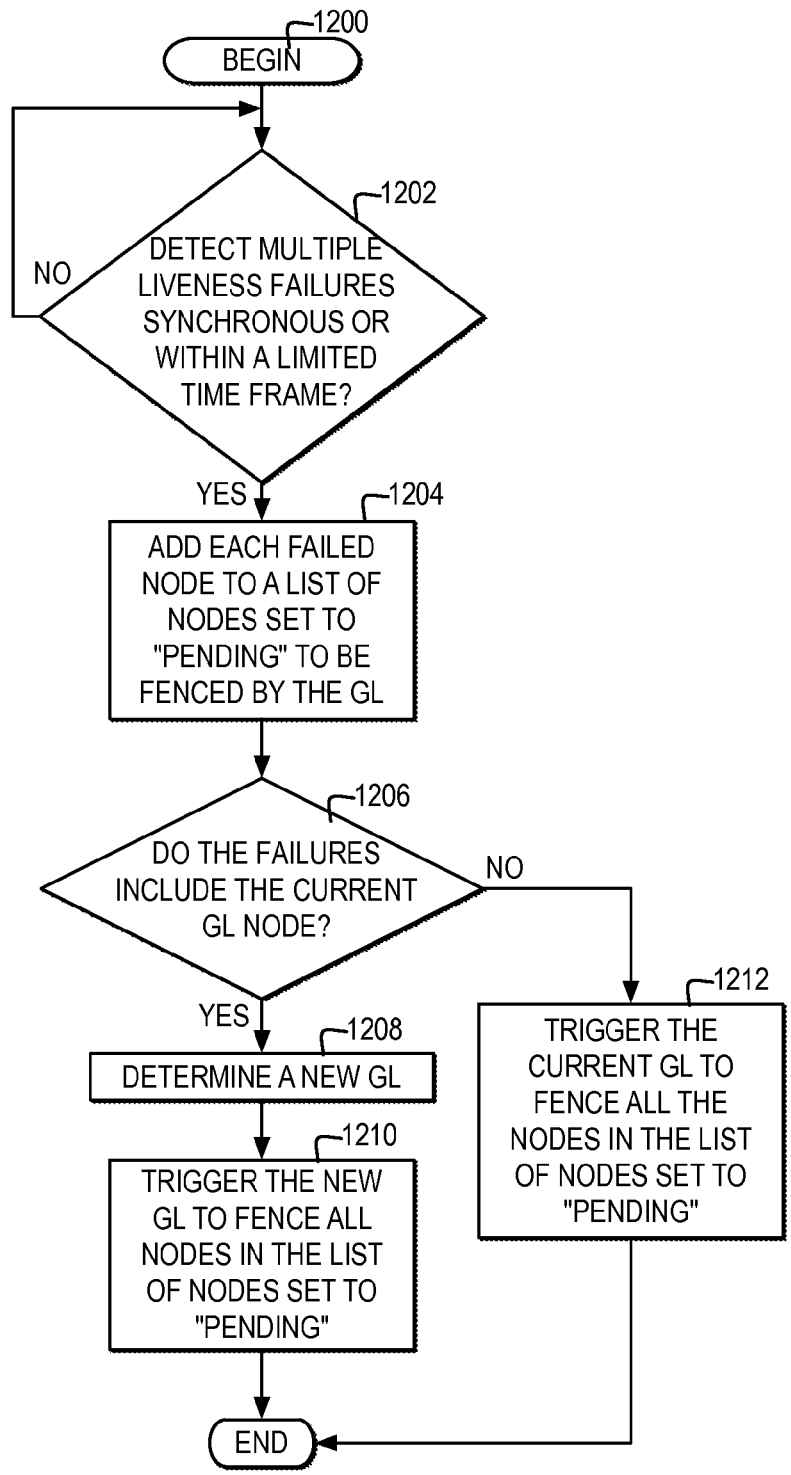
FIG. 12 is a high level logic flowchart illustrating a process and program for controlling quorum services for handling multiple synchronous or closely timed failures, where the quorum services integrate node fencing.

In one embodiment, the operations performed by processor 212 may control the operations of flowchart of FIGS. 11 and 12 and other operations described herein. Operations performed by processor 312 may be requested by software 250 or other code or the steps of the present invention might be performed by specific hardware components that contain hardwired logic for performing the steps, or by any combination of programmed computer components and custom hardware components.

Those of ordinary skill in the art will appreciate that aspects of one embodiment of the invention may be embodied as a system, method or computer program product. Accordingly, aspects of one embodiment of the invention may take the form of an entirely hardware embodiment, an entirely software embodiment (including firmware, resident software, microcode, etc.) or an embodiment containing software and hardware aspects that may all generally be referred to herein as "circuit," "module," or "system." Furthermore, aspects of one embodiment of the invention may take the form of a computer program product embodied in one or more tangible computer readable medium(s) having computer readable program code embodied thereon.

Any combination of one or more computer readable tangible medium(s) may be utilized. The computer readable tangible medium is a computer readable storage medium. A computer readable storage medium is an electronic, magnetic, optical, semiconductor system, apparatus, or device, including a portable computer diskette, a hard disk, such as mass storage device 218, a random access memory (RAM), such as RAM 214, a read-only memory (ROM), an erasable programmable read-only memory (EPROM or Flash memory), a portable compact disc read-only memory (CDROM), an optical storage device, or a magnetic storage device. In the context of this document, a computer readable storage medium is any tangible medium that can contain or store a program for use by or in connection with an instruction executing system, apparatus, or device.

Program code embodied on a computer readable medium may be transmitted using any appropriate medium, including but not limited to, wireless, wireline, optical fiber cable, radio frequency (RF), etc., or any suitable combination of the foregoing.

Computer program code for carrying out operations of on embodiment of the invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, such as computer system 200, partly on the user's computer, as a stand-alone software package, partly on the user's computer and partly on a remote computer or entirely on the remote computer or server. In the latter scenario, the remote computer may be connected to the user's computer through any type of network, such as interconnection network 110, through a communication interface, such as network interface 232, over a network link that may be connected, for example, to interconnection network 110.

In the example, network interface 232 includes an adapter 234 for connecting computer system 200 to interconnection network 110 through a link. Although not depicted, network interface 232 may include additional software, such as device drivers, additional hardware and other controllers that enable communication. When implemented as a server, computer system 200 may include multiple communication interfaces accessible via multiple peripheral component interconnect (PCI) bus bridges connected to an input/output controller, for example. In this manner, computer system 200 allows connections to multiple clients via multiple separate ports and each port may also support multiple connections to multiple clients.

The present invention is described below with reference to flowchart illustrations and/or block diagrams of methods, apparatus (systems) and computer program products according to embodiments of the invention. Those of ordinary skill in the art will appreciate that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, such as computer system 200, or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer, such as computer system 200, or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Network interface 232, the network link to interconnection network 110, and interconnection network 110 may use electrical, electromagnetic, or optical signals that carry digital data streams. The signals through the various networks and the signals on interconnection network 110, the network link to interconnection network 110, and network interface 232 which carry the digital data to and from computer system 200, may be forms of carrier waves transporting the information.

In addition, computer system 200 may include multiple peripheral components that facilitate input and output. These peripheral components are connected to multiple controllers, adapters, and expansion slots, such as input/output (I/O) interface 226, coupled to one of the multiple levels of bus 222. For example, input device 224 may include, for example, a microphone, a video capture device, an image scanning system, a keyboard, a mouse, or other input peripheral device, communicatively enabled on bus 222 via I/O interface 226 controlling inputs. In addition, for example, a display device 220 communicatively enabled on bus 222 via I/O interface 226 for controlling outputs may include, for example, one or more graphical display devices, audio speakers, and tactile detectable output interfaces, but may also include other output interfaces. In alternate embodiments of the present invention, additional or alternate input and output peripheral components may be added.

Those of ordinary skill in the art will appreciate that the hardware depicted in FIG. 2 may vary. Furthermore, those of ordinary skill in the art will appreciate that the depicted example is not meant to imply architectural limitations with respect to the present invention.

Figure 3:
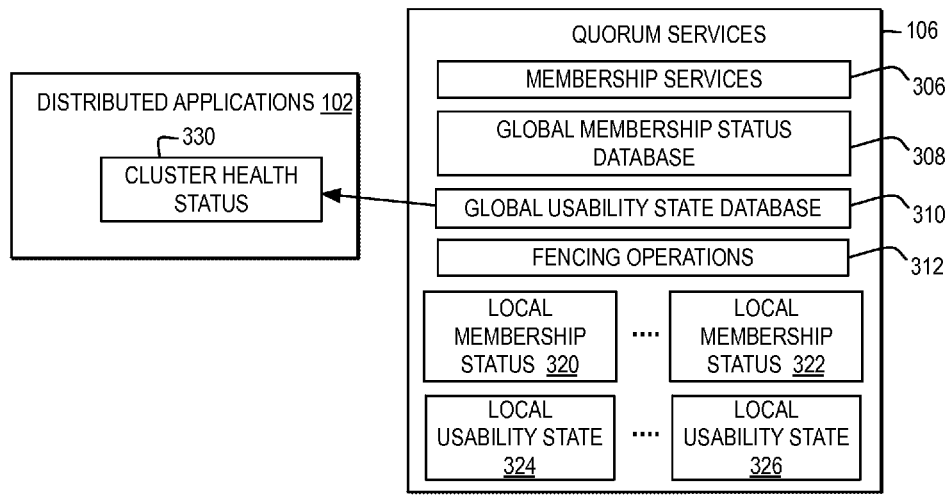
FIG. 3 is a block diagram depicting one example of components of quorum services of a cluster infrastructure with integrated automated node fencing.

With reference now to FIG. 3, a block diagram illustrates one example of components of quorum services of a cluster infrastructure with integrated automated node fencing. In the example, quorum services 106 include membership services 306 to manage node membership status by peer domain. For example, membership services 306 may implement a resource manager component to provide a command line interface for creating a new peer domain, joining new nodes to the domain, changing the domain membership of nodes, listing nodes in the domain, and other functions for creating and administering a peer domain. Cluster environment 110 may include one or more peer domains.

Membership services 306 manage node membership by domain in a global membership status database 308, where global membership status database 308 indicates quorum configuration including, but not limited to, domain membership of each node, characteristics of each peer domain, quorum requirements, and other membership and peer domain factors. Global membership status database 308 may represent a global instance of the membership status database or may represent an instance of the membership status database stored locally and persistently maintained at one of the nodes. Membership status may be maintained in global membership status database 308 and membership services 306 may propagate a local copy of the membership status of nodes within each node's peer domain to each node, illustrated as local membership statuses 320 and 322. In one example, membership status of a node may indicate whether the node is "active" or in "standby".

Membership services 306 may automatically monitor for the liveness of each node in a peer domain by performing heartbeat rings or other communication liveness checks between the communication interfaces of nodes in a peer domain. In particular, membership services 306 may monitor the communication between nodes in a peer domain for communication indicative of liveness according to characteristics set for the particular peer domain including, but not limited to, the number of missed heartbeats that constitute a failure, the number of seconds between heartbeats, whether or not broadcast should be used, and whether or not source routing should be used.

Membership services 306 may also monitor each peer domain for quorum requirements, where quorum requirements refers to the minimum number of nodes within the peer domain required to carry out a particular operation. Membership services 306 may monitor for multiple kinds of quorum requirements including, but not limited to, startup quorum specifying the number of nodes needed to bring a peer domain online, configuration quorum specifying the minimum number of nodes needed to perform operations that modify the peer domain's configuration information, and operational quorum specifying the minimum number of nodes needed to safely activate resources without creating conflicts with another subdomain. In particular, membership services 306 apply operational quorum requirements to protect data on shared resources following domain partitioning, where domain partitioning occurs when a peer domain is divided into one or more sub-domains because of failures within the peer domain or other events.

Fencing operations 312 provide automated node fencing operations for quorum services 106. First, fencing operations 312 maintain a usability state of each node within a sub-domain, updated within a global usability state database 310 and persistently propagated to each node for local storage by each node, as illustrated by local usability states 324 and 326. In one example, the usability state of each node is either set to "usable", "pending", or "unusable". As will be further described with reference to FIG. 4, fencing operations 312 manages the usability state of each node in conjunction with membership services 306 managing node domain membership and quorum requirements of nodes within peer domains. Second, fencing operations 312 implement automated node fencing mechanisms for fencing one or more nodes, in conjunction with membership services 306 applying quorum requirements to protect data on shared resources following events which trigger domain partitioning. Fencing operations 312 may implement one or more types of node fencing mechanisms for fencing a node including, but not limited to, applying power or input/output (I/O) controls to restrict node access to a shared resource.

In one example, fencing operations 312 may propagate usability state updates to nodes from global usability state database, for updating local usability state records of nodes, illustrated as local usability states 324 and 326. In addition, fencing operations 312 implemented locally at each node may detect events triggering changes in usability states of one or more nodes and broadcast the usability state changes to each node, as well as updating the state recorded in the local usability state recorded at the broadcasting node.

Quorum services 106 may report a cluster health status 330 to distributed applications 102, where cluster health status 330 may include the usability state of one or more nodes from global usability state database 310. The usability state of each node reported in cluster health status 330 provides a reliable status of each node's ability to provide service and access to shared resources. In addition, cluster health status 330 may include the membership status of one or more nodes from global membership status database 308.

It is important to note that components of membership services 306 and fencing operations 312 may be distributed across nodes, such that each node may locally trigger membership services 306 and fencing operations 312, and that an administrative or management node may also coordinate global components of membership services 306 and fencing operations 312.

Figure 4:
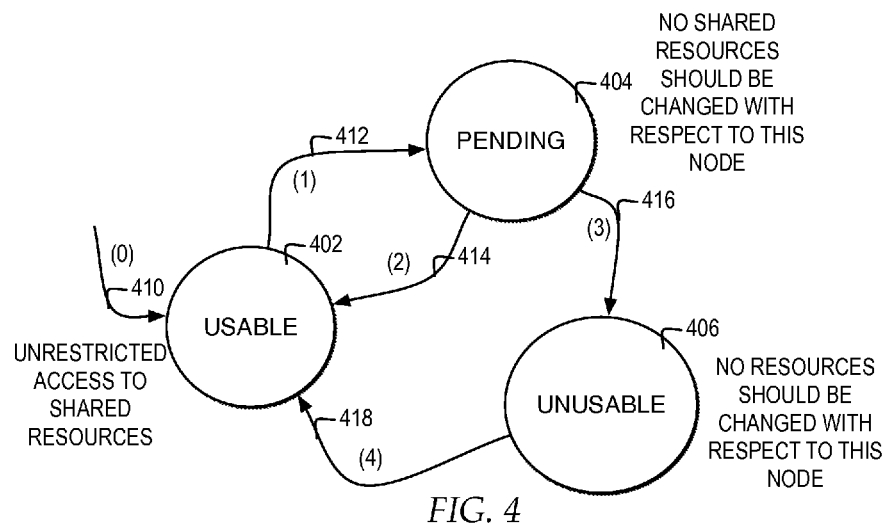
FIG. 4 is a block diagram illustrating a flow diagram depicting the flow of usability states for tracking the usability state of a node.

Referring now to FIG. 4, a block diagram illustrates a flow diagram depicting the flow of usability states for tracking the usability state of a node. In the example, flow diagram 400 illustrates examples of three states to which a node usability state may transition as managed by fencing operations 312, illustrated as usable state 402, pending state 404, and unusable state 406. One of ordinary skill in the art will recognize that additional or alternate states may be implemented for tracking a usability state of a node.

In the example, usable state 402 represents a state in which the node is unrestricted from controlling shared resources. Usable state 402 indicates that the node has never been fenced or was successfully fenced following a failure and may safely resume service when it rejoins the cluster.

Pending state 404 represents a state in which a problem was detected at the node and the node will be fenced by the cluster sub-domain that retains quorum. While in pending state 404, shared resources should not be changed with respect to the node and no operational changes should be made to a node until fencing can be completed or fencing fails and the node is transitioned to unusable state 406.

Unusable state 406 represents a state indicating an attempt to fence a node has failed. The value of unusable state 406 persists over the life of a cluster or domain, even if the node leaves and then later rejoins. Once a node reaches unusable state 406, fencing operations 312 may require that the usability state of the node be reset by a cluster administrator when the node is determined to be safe to resume service or may implement a resetting service for automatically determining when a node is safe to resume service and resetting the usability state of the node.

In the example, as illustrated at reference numeral 410, when a node is initialized, fencing operations 312 set the initial usability state of a node in global usability state database 310 to usable state 402 and the node is unrestricted from controlling resources.

Next, as illustrated by the transition at reference numeral 412, if membership services 306 detects a node failure, fencing operations 312 transition the node usability state of the node to pending state 404, the node's usability state in global usability state database 310 is set to "pending", and fencing operations 312 will trigger a node set to the fencing role to attempt to fence the failed node. When the node's usability status is set to pending, operational changes to the node should be blocked and any shared resources associated with the node should not be changed.

Next, as illustrated at reference numeral 414, if fencing operations 312 are able to successfully fence the node, then fencing operations 312 transition the node usability state of the node to usable state 402, indicating the shared resources may be failed over from the node and the node is once again unrestricted for cluster service when it rejoins the cluster.

As illustrated at reference numeral 416, if fencing operations 312 are not able to successfully fence the node, then fencing operations 312 transition the node usability state of the node to unusable state 406. When the node's usability state is set to unusable, the state of the node is unknown, the node could not be fenced, and resources should not be changed with respect to the node, to avoid corrupting data.

As illustrated at reference numeral 418, if the usability state of a node is set to unusable, but the node usability state is reset, then the node is once again available rejoin the cluster and is unrestricted from controlling resources.

Figure 5:
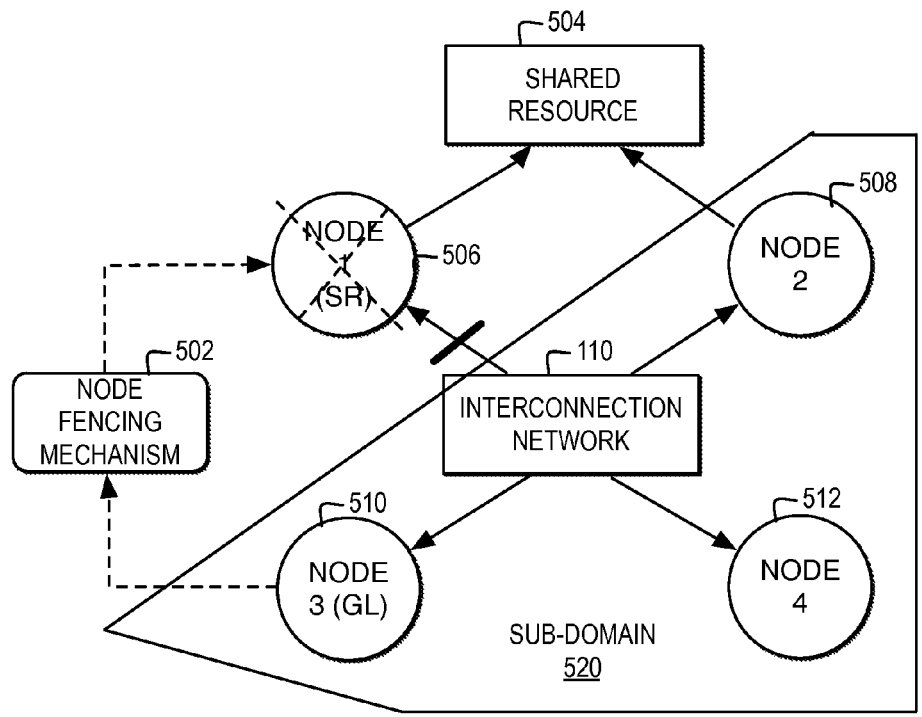
FIG. 5 is a block diagram depicting one example of automatically implementing a node fencing mechanism at the cluster infrastructure level to manage a failover of a shared resource.

With reference now to FIG. 5, a block diagram illustrates one example of automatically implementing a node fencing mechanism at the cluster infrastructure level to manage a failover of a shared resource. In the example, a peer domain membership for a cluster is configured to include a node 1 506, node 2 508, node 3 510, and node 4 512, connected via interconnection network 110, and managed by cluster infrastructure 104. In the example, node 1 560 and node 2 508 each access a shared resource 504, with node 1 controlling shared resource 504, as indicated by (SR).

In the example, membership services 306 detect a failure in node 1 506 that triggers domain partitioning. Membership services 306 detect the failure event triggering a domain partitioning and determine which sub-domain will retain quorum. In the example, domain partitioning results in one sub-domain with node 1 506 and another sub-domain 520 with node 2, 508, node 3 510, and node 4 512. In the example, membership services 306 determine that the sub-domain with node 2 508, node 3 510, and node 4 512 will retain quorum.

Because quorum services 106 integrate automated fencing operations 312 with membership services 306, responsive to detecting the failure in node 1 506 triggering domain partitioning, fencing operations 312 transition the state of node 1 506 from "usable" to "pending". In the event of the state of node 1 506 transitioning to "pending", fencing operations 312 will select a single node from the sub-domain retaining quorum to control the fencing of the failed node. In one example, the single node selected to perform the fencing role is also illustrated as the group leader (GL) node. The GL node illustrated in the example may be the same node selected within an RSCT based cluster infrastructure as the GL. In particular, when a peer domain is established, membership services 306 may assign a GL node. When a peer domain is partitioned, membership services 306 will assign a new GL node within the sub-domain retaining quorum if the sub-domain retaining quorum does not include the GL. In the example, node 3 510 of sub-domain 520 is the GL of the sub-domain retaining quorum.

The node set to perform the fencing role, for example node 3 510 as the GL, automatically triggers node fencing mechanism 502 from node fencing operations 312 to fence node 1 506. In particular, even though node 3 510 may not be able to communicate directly with node 1 506 via the communication channels of interconnection network 110, node 3 510 may trigger node fencing mechanism 502 to control the power or input/output channels of node 1 506 to restrict node 1 506 from controlling or accessing shared resource 504.

Fencing operations 312 may determine whether node fencing mechanism 502 is successful in fencing node 1 506. If node fencing mechanism 502 is successful in fending node 1 506, then fencing operations 312 will transition the usability state for node 1 506 from "pending" to "usable" and shared resource 504 may failover, with node 2 508 assuming control of shared resource 504.

Figure 6:
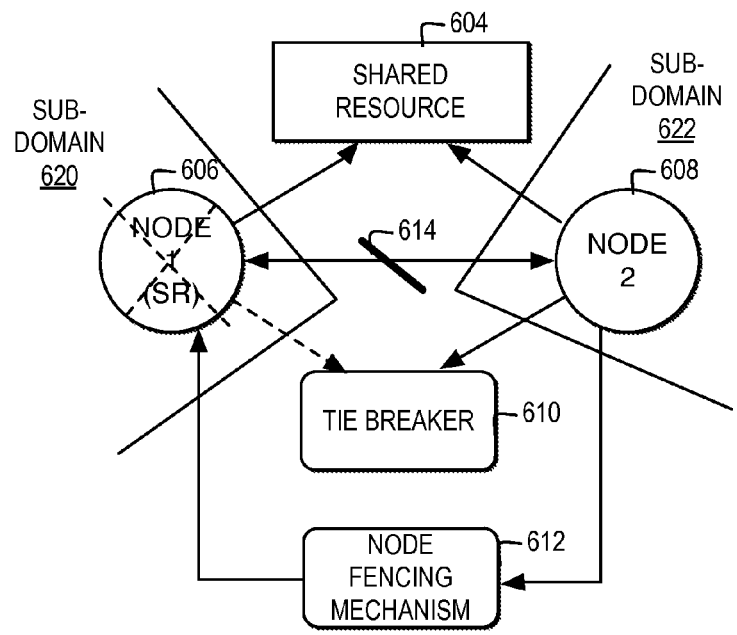
FIG. 6 is a block diagram illustrating one example of membership services implementing a tie breaker to determine quorum with automated node fencing integrated in quorum services.

Referring now to FIG. 6, a block diagram illustrated one example of membership services implementing a tie breaker to determine quorum with automated node fencing integrated in quorum services. When membership services 306 detects an event triggering a domain partitioning, membership services 306 may require a tie breaker operation to determine which sub-domain will retain quorum. In particular, following domain partitioning, membership services 306 may include a preference to assign operational quorum to the sub-domain with the majority of nodes. Following domain partitioning, however, each sub-domain may include the same number of nodes or otherwise require additional decision making to determine which sub-domain will retain quorum.

In one example, FIG. 6 illustrates an example where node 1 606 controls a shared resource 604 accessible to node 2 608 within a peer domain. A network failure 614 occurs between node 1 606 and node 2 608 and both nodes detect the other as down. After the failure, the domain partitioning results in a bisected cluster with an equal number of nodes in each sub-domain, illustrated by sub-domains 620 and 622, and where node 1 606 is in sub-domain 620 and node 2 608 is in another sub-domain 622. Membership services 306 detect the bisected cluster and acquire a tie breaker 610 to determine operational quorum. Tie breaker 610 is a process, function, or resource defined by membership services 306 that specifies how tie situations should be resolved.

In one example, a particular node within one of the sub-domains, such as node 2 608 in the example, may actually acquire tie breaker 610. A node acquiring tie breaker 610 to determine operational quorum may be asynchronous to the node failure.

When membership services 306 acquires tie breaker 610, because fencing operations 312 are integrated into quorum services 106, fencing operations 312 detect that a tie breaker has been acquired and transition the usability state of nodes in both sub-domains from "usable" to "pending", to block operational changes until the tie is resolved and fencing is completed.

In the example, tie breaker 610 determines that sub-domain 622 containing node 2 608 should be assigned quorum and membership services 306 assigns operational quorum to sub-domain 622. Node 2 608 calls a node fencing mechanism 612 to fence node 1 606. Fencing operations 312 may determine whether node fencing mechanism 612 is successful in fencing node 1 606. If node fencing mechanism 612 is successful in fending node 1 606, then fencing operations 312 will transition the usability states for node 1 606 and node 2 608 from "pending" to "usable" and shared resource 604 may failover, with node 2 608 assuming control of shared resource 604.

Figure 7:
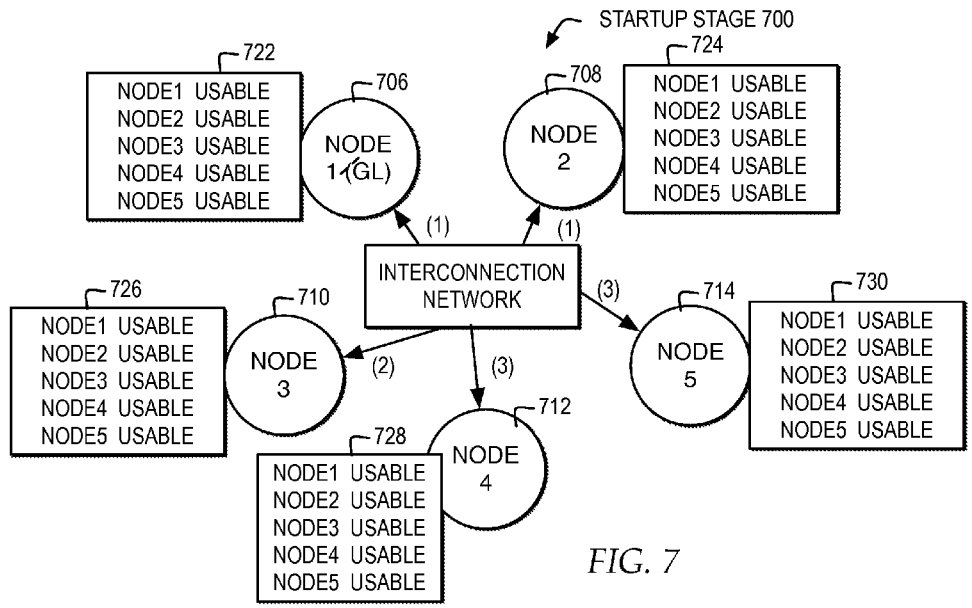
FIG. 7 is a block diagram depicting one example of locally maintaining usability states upon nodes joining a cluster.

With reference now to FIG. 7, a block diagram illustrates one example of locally maintaining usability states upon nodes joining a cluster. While a node usability state may be maintained globally in global usability state database 310, node usability state for each node is updated both locally and propagated through cluster protocols, for efficiency and consistency, even when multiple failures occur in succession.

In the example, upon initializing a node, prior to the node joining a cluster, membership services 306 and fencing operations 312 running locally on a node initialize the node with a local usability state for all cluster nodes set to a presumed value of "usable". For the join protocol, where nodes join the cluster as managed by membership services 306, fencing operations 312 propagate the global usability status of any nodes that do not have a global usability status of "usable" to the joining nodes. In particular, join protocols, membership change, and node usability update protocols are serialized by quorum services 106, guaranteeing the node usability state will be consistent on all nodes.

In the example illustrated during a startup stage 700, FIG. 7 shows the startup of a five node cluster domain. In the example, node 1 706 and node 2 708 join the cluster together, with local usability states 722 and 724 set with each node usability state set as "usable", and node 1 706 set as the group leader (GL). Next, node 3 710 joins the cluster, with local usability states 726 set with each node usability state set as "usable". Finally, node 4 712 and node 5 714 join the cluster, with local usability states 728 and 730 set with each node usability state set as "usable". In the example, quorum services 106 do not propagate the usability state during any of the joins because all nodes are set to the "usable" state.

Figure 8:
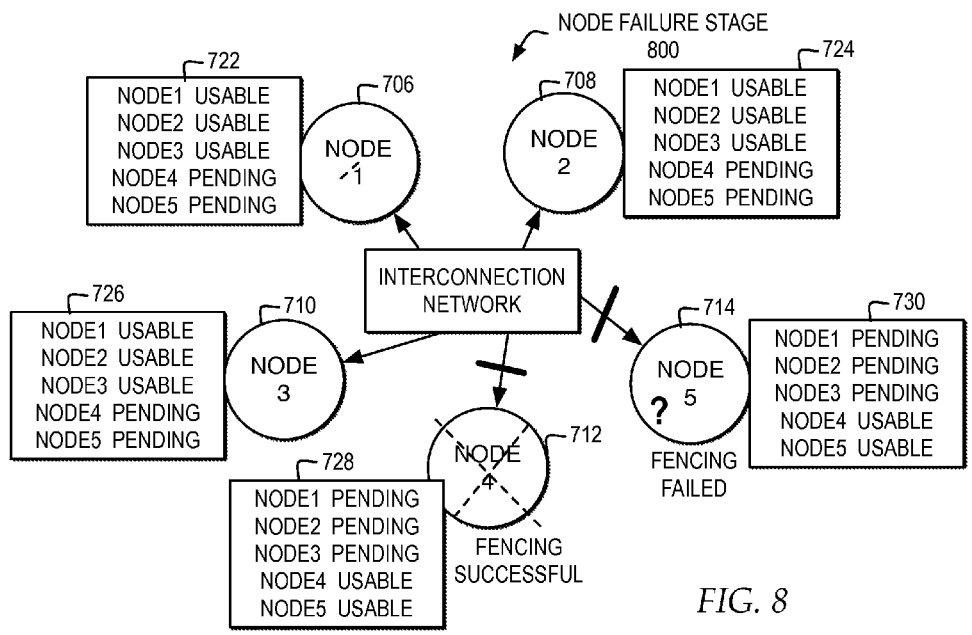
FIG. 8 is a block diagram illustrating one example of locally maintaining persistent usability states upon node failure.

Referring now to FIG. 8, a block diagram illustrates one example of locally maintaining persistent usability states upon node failure. In the example, node 1 706, node 2 708, node 3 710, node 4 712, and node 5 714 have previously joined a cluster, as illustrated in reference numeral FIG. 7, with node 1 722 set as the GL. FIG. 8 illustrates node failure stage 800 in which membership services 306 detects network failures in node 4 712 and node 5 714. The network failure in node 4 712 and node 5 714 trigger domain partitioning with node 1 706, node 2 708, and node 3 710 in one sub-domain isolated from node 4 712 and node 5 714. Membership services 306 reports the node failures to all nodes in the cluster and fencing operations 312 at each node may locally change the local node usability states of nodes in the other sub-domain from "usable" to "pending". For example, as illustrated in local usability states 722, 724, and 726, based on the node failure reports propagated by membership services 306 to node 1 706, node 2 708, and node 3 710, the node usability state locally set for "node 4" and "node 5" for each of these nodes is changed from "usable" to "pending". In addition, as illustrated in local usability states 728 and 730, based on the node failure reports propagated by membership services to node 4 712 and node 5 714, the node usability state locally set for "node 1", "node 2", and "node 3" for each of these nodes is changed from "usable to "pending".

In the example, membership services 306 assigns quorum to the sub-domain with node 1 706, node 2 708, and node 3 710, with node 1 706 as the current GL. Node 1 706, upon detecting the local usability states for "node 4" and "node 5" set to "pending", attempts to fence node 4 712 and node 5 714 by calling node fencing mechanisms of fencing operations 312. In the example, the node fence mechanism for node 4 712 reports to node 1 706 that fencing is successful and the node fence mechanism for node 5 714 reports to node 1 706 that the node fencing attempt failed.

Figure 9:
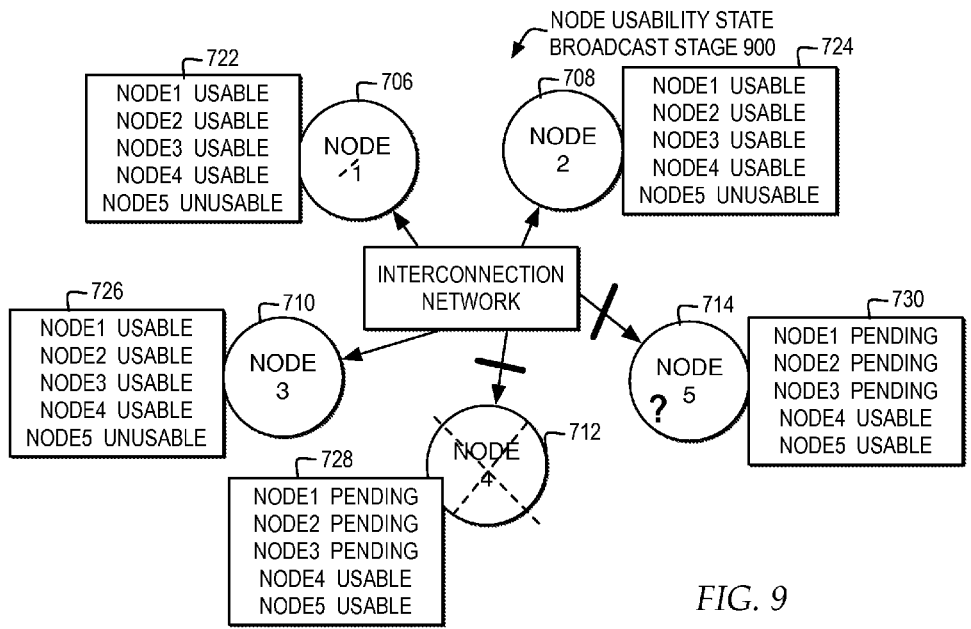
FIG. 9 is a block diagram depicting one example of locally maintaining persistent usability states upon node failure following node fencing.

Referring now to FIG. 9, a block diagram illustrates one example of locally maintaining persistent usability states upon node failure following node fencing. In the example, node 1 has received the results from node fencing mechanisms of attempts to fence node 4 712 and node 5 714, as described with reference to node failure stage 800 of FIG. 8. FIG. 9 illustrates a node usability broadcast stage 900. Since node 1 706 detects node 4 712 fencing was successful, node 1 706 sets the node usability state of node 4 712 to "usable". Since node 1 706 detects the attempt at fencing node 5 714 was not successful, node 1 706 sets the node usability state of node 5 714 to "unusable". Node 1 706 then broadcasts the node usability states of node 4 712 and node 5 714 to the surviving nodes, including node 2 708 and node 3 710, in a node usability state protocol to update local usability states 724 and 726, as well as updating local usability state 722 during the broadcast to ensure consistency.

Figure 10:
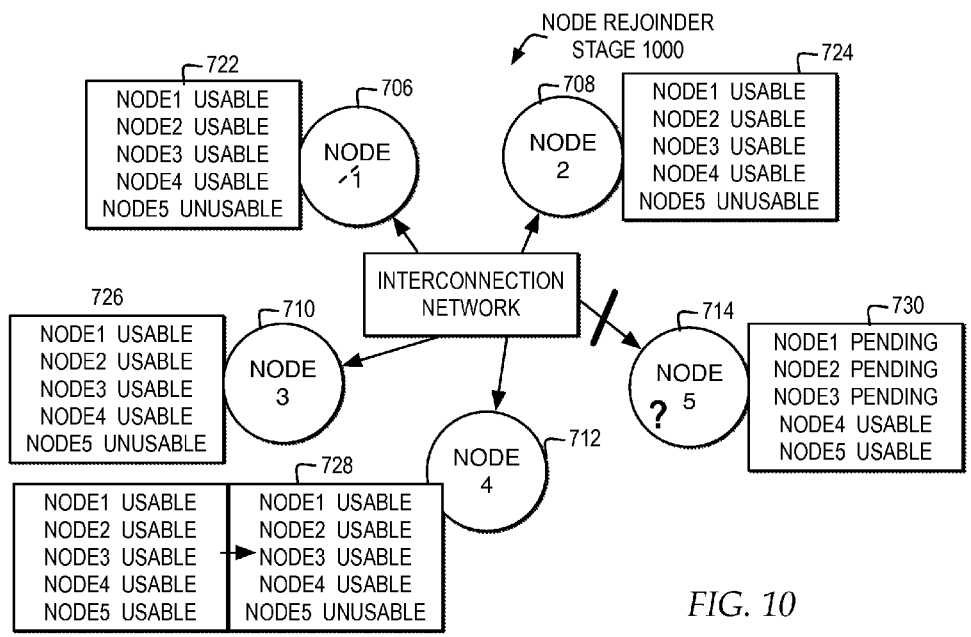
FIG. 10 is a block diagram illustrating one example of locally maintaining persistent usability states upon rejoinder of a node to a cluster.

With reference now to FIG. 10, a block diagram illustrates one example of locally maintaining persistent usability states upon rejoinder of a node to a cluster. In the example, node 4 712 was previously successfully fenced, as described with reference to FIG. 8 and FIG. 9. FIG. 10 illustrates a node rejoinder stage 1000. Node 4 712 begins the rejoinder process by first resetting all states in local usability state 728 to "usable". Membership services 306 detect the request to rejoin node 4 712 to the cluster and propagate the "unusable" usability state of "node 5" to node 4 712. Node 4 712 updates the usability state set for "node 5" in local usability state 728 to "unusable", as illustrated. Node 5 714 continues to remain unusable and must be reset before joining the cluster.

Referring now to FIG. 11, a high level logic flowchart depicts a process and program for controlling quorum service events where the quorum services integrate node fencing. In the example, the process starts at block 1100 and thereafter proceeds to block 1102. Block 1102 illustrates a determination at to the type of quorum activity detected, from among node initialization, node joins and rejoins, and liveness failures. One of ordinary skill in the art will appreciate that additional quorum services may detect and respond to additional types of quorum activity.

In the example, at block 1102, when the quorum activity indicates "initialize node", the process passes to block 1104. Block 1104 depicts setting the usability state of all nodes in the local usability state for the initialized node to "usable", in addition to performing other quorum service level node initialization steps, and the process ends.

In the example, at block 1102, when the quorum activity indicates "join" or "rejoin", the process passes to block 1106. Block 1106 depicts a determination whether the global usability state for a node is set to "usable". If the global usability state for a node is set to "usable", then the process passes to block 1110. If the global usability state for a node is not set to "usable", then the process passes to block 1108.

Block 1108 illustrates requiring a node to reset before allowing the node to join, and the process ends.

Block 1110 depicts a determination whether there are any node usability states not set to "usable" in the global usability state database. If there are not any nodes not set to "usable" in the global usability state database, then the process passes to block 1114. If there are nodes not set to "usable" in the global usability state database, then the process passes to block 1112. Block 1112 illustrates updating the node states for any node not set to "usable" in the local usability state for the joining node, and the process passes to block 1114. Block 1114 illustrates joining the node to the peer domain and updating the joined node usability state to the other nodes in the peer domain list, and the process ends.

Returning to block 1102, in the example, at block 1102, when the quorum activity indicates "liveness failure", then the process passes to block 1115. Block 1115 depicts determining the sub-domains resulting from the failure. Next, block 1116 illustrates a determination whether the node liveness failure has resulted in a bisected cluster domain. If the node failure has resulted in a bisected cluster domain, then the process passes to block 1118. Block 1118 depicts updating the node usability state for all tie nodes in the bisected cluster domain accessing a shared resource to "pending". Next, block 1120 illustrates selecting one of the nodes to call a tie breaker. Therefore, block 1122 depicts a determination whether the tie breaker returns a quorum decision. Once the tie breaker returns a quorum decision, then the process passes to block 1124. Block 1124 depicts updating the node usability state for the tie nodes in the quorum to "usable" and selecting a group leader (GL) node for the selected quorum and the process passes to block 1128.

Returning to block 1116, if the node failure has not resulted in a bisected cluster domain, then the process passes to block 1125. Block 1125 depicts updating the node usability state for the failed node to "pending". Next, block 1126 depicts selecting the sub-doman retaining quorum and setting a GL node. Thereafter, block 1128 illustrates the group leader for the quorum attempting to fence the failed node. Thereafter, block 1130 depicts a determination whether the fencing is successful. If the fencing is successful, then the process passes to block 1132. Block 1132 depicts updating the node usability state for the fenced nodes to "usable" and allowing the shared resource to failover, and the process ends. Returning to block 1130, if the fencing is not successful, then the process passes to block 1134. Block 1134 depicts updating the node usability state for the node not successfully fenced to "unusable", and the process ends.

With reference to FIG. 12, a high level logic flowchart depicts a process and program for controlling quorum services for handling multiple synchronous or closely timed failures, where the quorum services integrate node fencing. In the example, the process starts at block 1200 and thereafter proceeds to block 1202. Block 1202 depicts a determination whether multiple liveness failures, which are synchronous or within a limited time frame, are detected. If multiple liveness failures are detected, then the process passes to block 1204. Block 1204 depicts adding each failed node to a list of nodes set to "pending" to be fenced by the GL node. Next, block 1206 illustrates a determination whether the failures include the currentl GL node. If the failures do not include the current GL node, then the process passes to block 1212. Block 1212 depicts triggering the current GL node to fence all the nodes in the list of nodes set to "pending", as described in FIG. 11, and the process ends. Returning to block 1206, if the failure do include the current GL node, then the process passes to block 1208. Block 1208 illustrates determining a new GL node. Next, block 1210 depicts triggering the new GL node to fence all the nodes in the list of nodes set to "pending", whether or not the nodes were fenced by the previous GL before the previous GL failed, and the process ends. In particular, by triggering the new GL to fence all the nodes in the list of nodes set to "pending", duplicate fencing attempts by the previous GL and the new GL may occur, however the new GL will attempt to fence all nodes set to "pending" to guarantee safe operations and to guarantee the reliability of the node usability state of each node.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, occur substantially concurrently, or the blocks may sometimes occur in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification specify the presence of stated features, integers, steps, operations, elements, and/or components, but not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the one or more embodiments of the invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the invention has been particularly shown and described with reference to one or more embodiments, it will be understood by those skilled in the art that various changes in form and detail may be made therein without departing from the spirit and scope of the invention.

What is claimed is:

1. A method for managing quorum services in a cluster infrastructure for reliable failover of shared resources, comprising:

responsive to detecting, using a processor, by a quorum service, a plurality of liveness failures of at least two failed nodes from among a plurality of nodes in a domain of a cluster infrastructure layer of a cluster environment within a limited time frame, adding the at least two failed nodes to a list of nodes set to pending to be fenced by a group leader node from among the plurality of nodes;

determining, by the quorum service, whether the at least two failed nodes include the group leader node;

responsive to the at least two failed nodes not including the group leader node, triggering, by the quorum service, the group leader node to trigger at least one fencing operation to fence the at least two failed nodes in the list of nodes; and responsive to the at least two failed nodes including the group leader node, setting a new node as the group leader node and triggering, by the quorum service, the new node set as the group leader node to trigger the at least one fencing operation to fence the at least two failed nodes in the list of nodes.

2. The method according to claim 1, further comprising:

triggering the at least one fencing operation by the quorum service within the cluster infrastructure layer of the cluster environment comprising the plurality of nodes to reliably maintain a node usability state of each node of the plurality of nodes indicating an availability of each node to control and access at least one shared resource of the cluster.

3. The method according to claim 2, further comprising:

maintaining each of the plurality of nodes with a separate node usability state of one of usable, pending, and unusable;

setting the node usability state to usable when a node has unrestricted access to the at least one shared resource of the cluster;

setting the node usability state to pending when a node will be fenced by the automated fencing operation and changes to the at least one shared resource are not permitted with respect to the node; and setting the node usability state to unusable when a node has failed to be fenced, changes to the at least one shared resource are not permitted with respect to the node, and the node is blocked from joining any domain in the cluster until the node is reset.

4. The method according to claim 1, further comprising:

monitoring, by the quorum service, the liveness of each of the plurality of nodes in the domain of the cluster; and responsive to detecting the liveness failure of at least one failed node from among the plurality of nodes controlling the shared resource, determining, by the quorum service, the group leader node for a sub-domain of a selection of the plurality of nodes retaining quorum and updating the node usability state for the at least one failed node as pending at the selection of the plurality of nodes.

5. A computer system for managing quorum services in a cluster infrastructure for reliable failover of shared resources, comprising:

a quorum service implemented in a cluster environment on at least one processor coupled to at least one memory;

the quorum service, responsive to detecting a plurality of liveness failures of at least two failed nodes from among a plurality of nodes in a domain of a cluster infrastructure layer of the cluster environment within a limited time frame, operative to add the at least two failed nodes to a list of nodes set to pending to be fenced by a group leader node from among the plurality of nodes;

the quorum service operative to determine whether the at least two failed nodes include the group leader node;

the quorum service, responsive to the at least two failed nodes not including the group leader node, operative to trigger the group leader node to trigger at least one fencing operation to fence the at least two failed nodes in the list of nodes; and the quorum service, responsive to the at least two failed nodes including the group leader node, operative to set a new node as the group leader node and operative to trigger the new node set as the group leader node to trigger the at least one fencing operation to fence the at least two failed nodes in the list of nodes.

6. The system according to claim 5, further comprising:

the quorum service operative to trigger the at least one fencing operation by the quorum service within the cluster infrastructure layer of the cluster environment comprising the plurality of nodes to reliably maintain a node usability state of each node of the plurality of nodes indicating an availability of each node to control and access at least one shared resource of the cluster.

7. The system according to claim 6, further comprising:

the quorum service operative to maintain each of the plurality of nodes with a separate node usability state of one of usable, pending, and unusable;

the quorum service operative to set the node usability state to usable when a node has unrestricted access to the at least one shared resource of the cluster;

the quorum service operative to set the node usability state to pending when a node will be fenced by the automated fencing operation and changes to the at least one shared resource are not permitted with respect to the node; and the quorum service operative to set the node usability state to unusable when a node has failed to be fenced, changes to the at least one shared resource are not permitted with respect to the node, and the node is blocked from joining any domain in the cluster until the node is reset.

8. The system according to claim 5, further comprising:

the quorum service operative to monitor the liveness of each of the plurality of nodes in the domain of the cluster; and the quorum service, responsive to detecting the liveness failure of at least one failed node from among the plurality of nodes controlling the shared resource, operative to determine the group leader node for a sub-domain of a selection of the plurality of nodes retaining quorum and updating the node usability state for the at least one failed node as pending at the selection of the plurality of nodes.

9. A computer program product for managing quorum services in a cluster infrastructure for reliable failover of shared resources, said computer program product comprising:

one or more computer-readable tangible storage devices;

program instructions, stored on at least one of the one or more storage devices, responsive to detecting a plurality of liveness failures of at least two failed nodes from among a plurality of nodes in a domain of a cluster infrastructure layer of a cluster environment within a limited time frame, to add the at least two failed nodes to a list of nodes set to pending to be fenced by a group leader node from among the plurality of nodes;

program instructions, stored on at least one of the one or more storage devices, to determine whether the at least two failed nodes include the group leader node;

program instructions, stored on at least one of the one or more storage devices, responsive to the at least two failed nodes not including the group leader node, to trigger the group leader node to trigger at least one fencing operation to fence the at least two failed nodes in the list of nodes; and program instructions, stored on at least one of the one or more storage devices, responsive to the at least two failed nodes including the group leader node, to set a new node as the group leader node and to trigger the new node set as the group leader node to trigger the at least one fencing operation to fence the at least two failed nodes in the list of nodes.

10. The computer program product according to claim 9, further comprising:

program instructions, stored on at least one of the one or more storage devices, to trigger the at least one fencing operation by a quorum service within the cluster infrastructure layer of the cluster environment comprising the plurality of nodes to reliably maintain a node usability state of each node of the plurality of nodes indicating an availability of each node to control and access at least one shared resource of the cluster.

11. The computer program product according to claim 10, further comprising:

program instructions, stored on at least one of the one or more storage devices, to maintain each of the plurality of nodes with a separate node usability state of one of usable, pending, and unusable;

program instructions, stored on at least one of the one or more storage devices, to set the node usability state to usable when a node has unrestricted access to the at least one shared resource of the cluster;

program instructions, stored on at least one of the one or more storage devices, to set the node usability state to pending when a node will be fenced by the automated fencing operation and changes to the at least one shared resource are not permitted with respect to the node; and program instructions, stored on at least one of the one or more storage devices, to set the node usability state to unusable when a node has failed to be fenced, changes to the at least one shared resource are not permitted with respect to the node, and the node is blocked from joining any domain in the cluster until the node is reset.

12. The computer program product according to claim 9, further comprising:

program instructions, stored on at least one of the one or more storage devices, to monitor the liveness of each of the plurality of nodes in the domain of the cluster; and program instructions, stored on at least one of the one or more storage devices, responsive to detecting the liveness failure of at least one failed node from among the plurality of nodes controlling the shared resource, to determine the group leader node for a sub-domain of a selection of the plurality of nodes retaining quorum and updating the node usability state for the at least one failed node as pending at the selection of the plurality of nodes.

* * * * *